US007873785B2

(12) United States Patent
Olukotun

(10) Patent No.: US 7,873,785 B2
(45) Date of Patent: Jan. 18, 2011

(54) MULTI-CORE MULTI-THREAD PROCESSOR

(75) Inventor: Kunle A. Olukotun, Stanford, CA (US)

(73) Assignee: Oracle America, Inc., Redwood City, CA (US)

(*) Notice: Subject to any disclaimer, the term of this patent is extended or adjusted under 35 U.S.C. 154(b) by 1220 days.

(21) Appl. No.: 10/855,233

(22) Filed: May 26, 2004

(65) Prior Publication Data
US 2005/0044319 A1 Feb. 24, 2005

Related U.S. Application Data

(60) Provisional application No. 60/496,602, filed on Aug. 19, 2003.

(51) Int. Cl.
G06F 12/08 (2006.01)
(52) U.S. Cl. .................. 711/118; 711/119; 711/120; 711/122; 711/138; 710/305; 710/306; 710/317; 710/52; 712/32; 712/34
(58) Field of Classification Search ............. 711/118, 711/119, 120, 122, 138; 710/305, 306, 317, 710/52; 712/32, 34
See application file for complete search history.

(56) References Cited

U.S. PATENT DOCUMENTS

| | | | | |
|---|---|---|---|---|
| 5,907,712 A * | 5/1999 | Slane | | 710/269 |
| 5,974,538 A | 10/1999 | Wilmot, II | | |
| 6,016,542 A | 1/2000 | Gottlieb et al. | | |
| 6,209,020 B1 | 3/2001 | Angle et al. | | |
| 6,233,599 B1 * | 5/2001 | Nation et al. | | 718/102 |
| 6,931,489 B2 * | 8/2005 | DeLano et al. | | 711/122 |
| 7,062,606 B2 * | 6/2006 | Ober et al. | | 711/121 |
| 2003/0023659 A1 | 1/2003 | Kalafatis et al. | | |
| 2003/0088610 A1 | 5/2003 | Kohn et al. | | |
| 2003/0198251 A1 * | 10/2003 | Black et al. | | 370/462 |
| 2003/0233394 A1 * | 12/2003 | Rudd et al. | | 709/107 |
| 2004/0117561 A1 * | 6/2004 | Quach et al. | | 711/146 |
| 2006/0248384 A1 * | 11/2006 | Safford | | 714/11 |

OTHER PUBLICATIONS

Craig B. Zilles, Joel S. Emer and Gurindar S. Sohi, "The Use of Multithreading for Exception Handling", Proceedings of the $32^{nd}$ annual ACM/IEEE International Symposium on Microarchitecture, Nov. 1999 IEEE, pp. 219-229.

* cited by examiner

Primary Examiner—Tuan V Thai
Assistant Examiner—Midys Rojas
(74) Attorney, Agent, or Firm—Martine Penilla & Gencarella, LLP

(57) ABSTRACT

A processor is provided. The processor includes at least two cores. The at least two cores have a first level cache memory and are multi-threaded. A crossbar is included. A plurality of cache bank memories in communication with the at least two cores through the crossbar is provided. Each of the plurality of cache bank memories communicates with a main memory interface. A plurality of input/output interface modules in communication with the main memory interface and providing a link to the at least two cores are included. The link bypasses the plurality of cache bank memories and the crossbar. Threading hardware configured to enable the at least two cores to switch from a first thread to a second thread in a manner hiding delays caused by cache accesses is included. A server and a method for determining when to switch threads in a multi-core multi-thread environment are included.

20 Claims, 8 Drawing Sheets

MULTI-CORE MULTI-THREAD PROCESSOR

CROSS REFERENCE TO RELATED APPLICATIONS

This application claims priority from U.S. Provisional Patent Application No. 60/496,602 filed Aug. 19, 2003 and entitled "WEB SYSTEM SERVER DESIGN SPECIFICATION". This provisional application is herein incorporated by reference.

BACKGROUND OF THE INVENTION

1. Field of the Invention

This invention relates generally to servers and more particularly to a processor architecture and method for serving data to client computers over a network.

2. Description of the Related Art

With the networking explosion brought along with introduction of the Internet, there has been a shift from the single thread desktop applications for personal computers to server applications that have multiple threads for serving multiple clients. Electronic commerce has created a need for large enterprises to serve potentially millions of customers. In order to support this overwhelming demand, the serving applications require different memory characteristics than the memory characteristics for desktop applications. In particular, the serving applications require large memory bandwidth and large cache memory requirements in order to accommodate a large number of clients.

In addition, conventional processors focus on instruction level parallelism. Therefore, the processors tend to be very large and the pipeline is very complex. Consequently, due to the complexity of the pipeline for processors, such as INTEL processors, only one core is on the die. Accordingly, when there is a cache miss or some other long latency event, there is usually a stall that causes the pipeline to sit idle. Serving applications are generally constructed to be more efficient with very little instruction level parallelism per thread. Thus, the characteristics of implementation for conventional processors with the application of serving workloads result in a poor fit since conventional processors focus on instruction level parallelism.

Additionally, the performance of processors based on instruction level parallelism (ILP), as a function of die size, power and complexity, is reaching a saturation point. Conventional ILP processors include well known processors from the PENTIUM™, ITANIUM™, ULTRASPARC™, etc., families. Thus, in order to increase performance, future processors will have to move away from the traditional ILP architecture.

In view of the forgoing, there is a need for a processor having an architecture better suited for serving applications in which the architecture is configured to exploit multi-thread characteristics of serving applications.

SUMMARY OF THE INVENTION

Broadly speaking, the present invention fills these needs by providing a processor having an architecture having a threading mechanism configured to efficiently process server applications. It should be appreciated that the present invention can be implemented in numerous ways, including as an apparatus, a system, a device, or a method. Several inventive embodiments of the present invention are described below.

In one embodiment, a processor is provided. The processor includes at least two cores. Each of the at least two cores has a first level cache memory and is multi-threaded. A crossbar is included. A plurality of cache bank memories in communication with the at least two cores through the crossbar is provided. Each of the plurality of cache bank memories is in communication with a main memory interface. A plurality of input/output (I/O) interface modules in communication with the main memory interface and providing a link to the at least two cores is included. The link bypasses the plurality of cache bank memories and the crossbar. Threading hardware configured to enable each of the at least two cores to switch from a first thread to a second thread in a manner hiding delays caused by cache accesses is included.

In another embodiment, a server is provided. The server includes an application processor chip. The application processor chip includes a plurality of multithreaded central processing unit cores. Each of the plurality of multi-threaded central processing unit cores has a load/store unit. A crossbar is provided. A plurality of cache bank memories in communication with the at least two cores through the crossbar is included. Each of the plurality of cache bank memories is in communication with a main memory interface. A plurality of input/output (I/O) interface modules are in communication with the main memory interface and provide a link to the at least two cores. The link bypasses the plurality of cache bank memories and the crossbar. The threading hardware is configured to enable each of the at least two cores to switch from a first thread to a second thread in a manner hiding delays caused by cache accesses.

In yet another embodiment, a method for determining when to switch threads in a multi-core multi-thread processor is provided. The method initiates with associating both a register and a register file with each thread of the multi-core multi-thread processor. Then, a cache hit/miss signal is monitored during an instruction fetch stage associated with a first thread. A valid bit associated with a register is also monitored. Then, either a cache miss signal or an invalid bit signal associated with the first thread is detected. Next, the first thread at an end of a corresponding stage is suspended in response to detecting the cache miss signal or the invalid bit signal. Then, a second thread for execution is selected.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for an apparatus and method for transmitting data between two processors in a manner that maintains line rate throughput. It will be obvious, however, to one skilled in the art, that the present invention may be practiced without some or all of these specific details. In other instances, well known process operations have not been described in detail in order not to unnecessarily obscure the present invention.

The embodiments described herein have multiple simple cores on a chip, where each of the cores have their own first level cache and the cores share a second level cache through a crossbar. Additionally, each of the cores have two or more threads. Through multi-threading, latencies due to memory loads, cache misses, branches, and other long latency events are hidden. In one embodiment, long latency instructions cause a thread to be suspended until the result of that instruction is ready. One of the remaining ready to run threads on the core is then selected for execution on the next clock (without introducing context switch overhead) into the pipeline. In one embodiment, a scheduling algorithm selects among the ready to run threads at each core. Thus, a high throughput architecture is achieved since the long latency event is performed in the background and the use of the central processing unit is optimized by the multiple threads.

Figure 1:
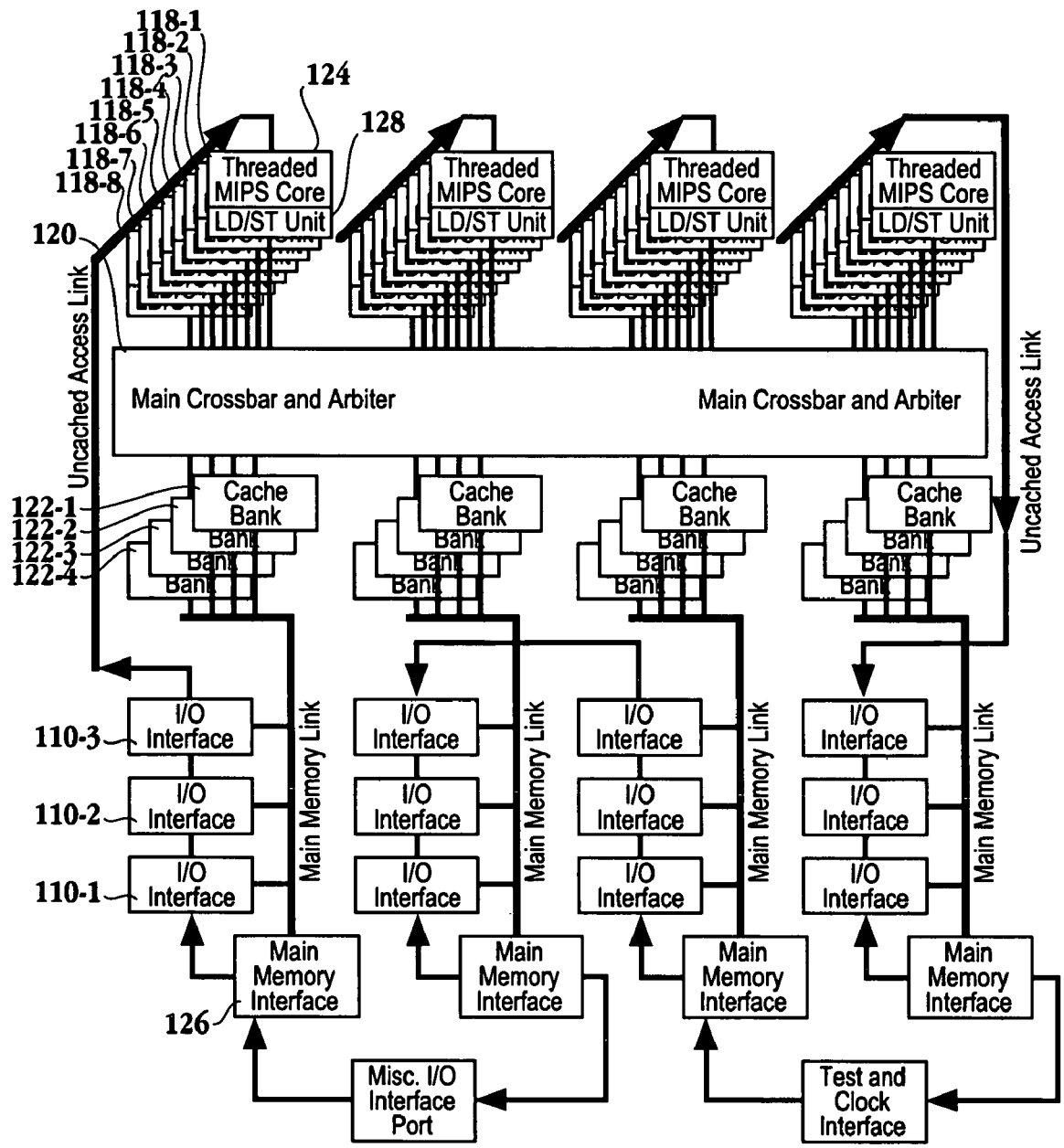
FIG. 1 is a schematic diagram of a processor chip having 4 sets of 8 multithreaded processor cores in accordance with one embodiment of the invention.

FIG. 1 is a schematic diagram of a processor chip having 4 sets of 8 multithreaded processor cores in accordance with one embodiment of the invention. Threaded cores 118-1 through 118-8 make up the first set of 8 cores of the chip. Each of threaded cores 118-1 through 118-8 include level 1 cache 124. Level 1 cache 124 includes instruction cache (I$) segment and data cache (D$) segment. Load/Store unit 128 is included within each of threaded cores 118-1 through 118-8. It should be appreciated that each of processor cores on the chip include an instruction cache, a data cache and a load store unit. Additionally, processor cores 118-1 through 118-8 are discussed for exemplary purposes, however, the discussion is applicable to all the cores illustrated in FIG. 1. In one embodiment, the load/store unit architecture is similar to that of reduced instruction set computer (RISC) architecture. Of course, the multithreading aspects of the present invention were not accommodated by the RISC architecture. In another embodiment, each of the processor cores are based upon SPARC™ technology of the assignee of the invention. Each processor core 118-1 through 118-8 is in communication with crossbar and arbiter 120. Crossbar 120 is optimized for processor traffic where it is desirable to obtain extremely low latency. Level 2 (L2) cache banks 122-1 through 122-4 are shared by processor cores 118-1 through 118-8. It should be appreciated that by sharing L2 cache banks 122-1 through 122-4 allows for concurrent access to multiple banks at the same time, thereby defining a high bandwidth memory system. In one embodiment, each of L2 cache banks have a size of about 1 megabyte (MB). It should be appreciated that while four L2 cache banks 122-1 through 122-4 are shown in FIG. 1, the invention is not limited to four L2 cache banks. That is, the number of L2 cache banks is sufficient to provide enough bandwidth from the L2 cache to keep all of the threads busy. In one embodiment, each processor core includes 4 threads. Thus, a single processor chip with eight cores will have 32 threads in this configuration. Each L2 cache bank 122-1 through 122-4 is in communication with main memory interface 126 through a main memory link in order to provide access to the main memory. It should be appreciated that while 8 cores are depicted on the processor chip, more or less cores can be included as the FIG. 1 is exemplary and not meant to be limiting.

Still referring to FIG. 1, main memory interface 126 is in communication with input/output (I/O) interface blocks 110-1 through 110-3 which provide uncached access to the threaded cores through the uncached access link. Thus, processor cores 118-1 through 118-8 are enabled to directly access a register in any of I/O devices through I/O interfaces 110-1-110-3 instead of communicating through the memory. It should be appreciated that the I/O interface blocks, main memory interface blocks, miscellaneous I/O interface port block, and test and clock interface block (the blocks in the lower half of FIG. 1) also drive off-chip pins.

Figure 2:
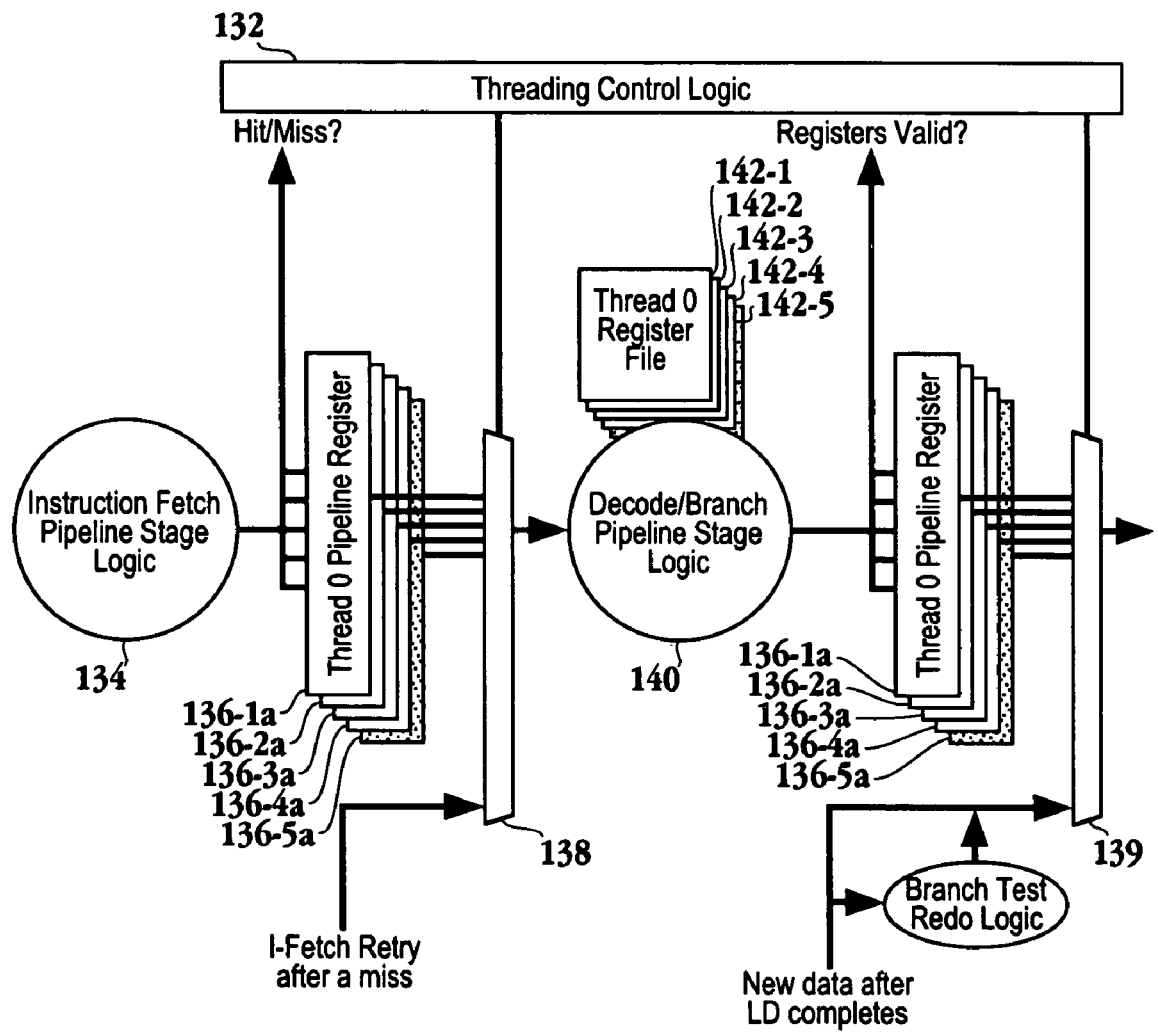
FIG. 2 is a simplified schematic diagram illustrating the threading mechanism enabling a processor core to switch from one cycle to another on a cycle-by-cycle basis to minimize delays in accordance with one embodiment of the invention.

FIG. 2 is a simplified schematic diagram illustrating the threading mechanism enabling a processor core to switch from one cycle to another on a cycle-by-cycle basis to minimize delays in accordance with one embodiment of the invention. It should be appreciated that the threading hardware is one of the differences between the MIPS instruction set architecture (ISA) core in the chip described herein and any other standard MIPS ISA core. That is, the threading hardware is configured to allow the core to switch from one thread to another on a cycle-by-cycle basis in order to hide delays that would otherwise be caused by the fact that a cache access takes considerably more than a single cycle, due to the merged-cache structure of the memory system. As illustrated in FIG. 2, the threading hardware primarily consists of register files 142-1 through 142-5, one for each thread, and duplicated pipeline registers 136-1a through 136-5a after instruction fetch (IF) pipeline stage logic 134 and a second set of duplicated pipeline registers 136-1b through 136-5b after decode/branch (D/B) pipeline stage 140. In addition to being duplicated, each register file 142-1 through 142-5 also has a second, non-standard write port in order to allow data returning from memory at unusual times to be written back into the register file as it arrives. The later pipeline stages are largely unaffected by threading, since an instruction is guaranteed to be able to complete normally, no matter which thread it is from, after it enters the execute (EX) stage. It should be noted that the thread identification (ID) number is maintained with each instruction so that register file writebacks and memory references may be properly assigned to respective threads. Threading control logic 132 includes logic for managing the multiple thread environment. For example, threading control logic 132 provides select signals for multiplexers 138 and 139 in order to move the proper data to the next pipeline stage.

In one embodiment, in order to allow the core to recognize when data has not been returned from a load, each register (i.e., file registers 142-1-144-5 and pipeline registers 136-1-136-5) has a "valid" bit attached to the register. The result register of any load instruction has this valid bit automatically cleared before the result may be forwarded to another instruction. Later, when the results of the load actually return from memory and are stored into the register file, the valid bits in those registers are set again so that execution may proceed normally.

In another embodiment, threading control logic 132 decides when to switch out threads by monitoring the cache hit/miss signal in IF stage 134 and the valid bits of any registers read by the instruction in the D/B stage 140 of the pipeline. If a cache miss and/or invalid register is detected, then the thread is "frozen" at the end of the pipe stage and another thread (if any are ready) is selected for execution during the next clock cycle using the alternate pipeline registers 136-1-136-5 and register files 142-1-142-5. If multiple threads are ready, a scheduling algorithm will choose which thread to schedule (e.g., through a round-robin scheme). If no threads are ready, then no operation (NOPs) signals will be forced into outputs of the IF and D/B pipeline registers until a thread is ready to run. It should be appreciated that instructions that have already propagated into the EX stage or beyond are not affected by the switch, and complete normally even after a freeze.

As data from memory returns, the recovered data is stored directly into the local instruction cache or register file immediately. If the thread requesting it is "frozen," i.e., waiting for the data, the data is also bypassed directly into the dependent instruction(s) of that thread. It should be appreciated that this process may be accomplished through either updating the pipeline registers 136-1 through 136-5 themselves with the retrieved data or in the alternative having special, dedicated bypass registers repeated for each thread on the side. After all the dependencies that triggered the freeze are cleared, the thread becomes "ready" and may be scheduled the next time the executing thread freezes.

While simple register and pipeline register shadowing will be sufficient in most cases, one special case does exist. When a freeze is caused by the input to a branch test, then the normal MIPS early-branch decision mechanism won't work, since the test will occur in parallel with the determination that the thread must be frozen. As a result, a duplicate copy of the branch-test mechanism is in the core in order to re-perform the branch test after the actual inputs arrive from memory (the original hardware will be busy executing another thread at this time, so that hardware cannot be used again). Once the duplicate hardware re-runs the test, it may correctly select the proper "next PC" for the first instruction fetch that will occur after the thread is thawed.

In one embodiment, the hardware preemptively forces thread freezes occasionally to prevent one thread from "hogging" the processor for too long. This can occur when a program is executed that avoids instruction cache misses and loads followed soon thereafter by data uses. The thread control logic maintains one or more watchdog counters to monitor the processor usage by the different threads (or just the running thread, in the simplest implementation). If a thread runs too long while other threads are ready to execute, then an artificial freeze is automatically generated to cause a thread switch. In one embodiment, the watchdog counters are operating system (OS)-readable, so that they may be used as a tool when scheduling decisions are made. However, it should be appreciated that the watchdog counters need not be OS-readable.

The processor is configured to handle excepting instructions. Here, the instructions in the pipeline are flushed to NOPs, the Exception Program Counter (EPC) is set to point the excepting instruction, the Program Counter (PC) of the thread is set to start fetching the exception handler, and the processor status register is adjusted so that the thread is running in kernel mode. However, it is also possible to have an exception triggered by a thread just after it is frozen. When a thread is frozen, instructions which have already progressed into the EX and Translation Lookaside Buffer (TLB) stages of the pipeline continue executing When these instructions complete, it is possible for one of them to trigger an exception during the two-cycle window after the thread is officially frozen out. When this occurs, the normal pipeline-flushing effect of an exception is inappropriate, because it could cause the state of the thread that has just been thawed (and is now filling the first half of the pipeline) to be damaged.

Instead, the actions required after an exception (pipeline flushing, switching to the exception handler in kernel mode, etc.) are simulated on a thread which is now partially in the pipeline and partially frozen in its alternate set of pipeline registers. In the pipeline, only the remaining executing instructions in the tail end of the just-frozen thread may be flushed (i.e. the instruction that was in the EX stage during the freeze will be flushed if the instruction that was in the TLB stage faults). It should be noted that instructions from the just-thawed thread, earlier in the pipeline, are not affected. Simultaneously, the frozen thread is prepared so that the thread will handle the exception properly the next time the thread is thawed. Both already-executing instructions in the frozen thread's pipeline are converted into NOPs, simulating the remainder of the pipeline flush. It should be appreciated that this has a side effect of making the frozen thread ready for execution, because the memory dependencies that forced it out will be eliminated. In addition, the normal exception EPC, PC, and status register adjustments are made. However, one skilled in the art will appreciate that the adjustments are made to the registers of the just frozen—thread, and not the thread that is starting to execute.

External interrupt handling is also impacted by the threading mechanisms. The external interrupt handling can either be handled in the "normal" MIPS way, by flushing the pipeline (subject to the restrictions above, if the interrupt strikes just after a thread freeze) and forcing the currently-executing thread to take an exception, or by switching to a thread that is pre-assigned to take all interrupts (the "$5^{th}$ thread"). The extra state required for the $5^{th}$ thread is indicated by the shading of registers 136-5a, 136-5b, and 142-5 in FIG. 2. The $5^{th}$ thread would automatically be switched in following an interrupt (or when the other threads were all frozen). Here, the thread-switch policy is applicable when there is a thread dedicated to running only interrupt handlers, since any general-purpose threads would have to take an exception in pretty much the same way prior to interrupt processing. With a dedicated thread, however, it would be possible to design the interrupt handlers so that the hardware could simply switch to the dedicated thread without performing a pipeline flush.

It should be appreciated that while reduced pipeline flushing is a desired feature, interrupt response time is an additional reason to dedicate a thread to interrupt handling. For example, four threads are pretty much required in order to keep the core busy almost all of the time, therefore, four threads capable of running general-purpose code are needed to keep the core busy. However, due to the fact that there is a chance all four threads might be "frozen" and waiting for a long-latency main memory reference when a high-priority external interrupt arrives, then in one embodiment, maintaining an extra thread provides a mechanism to guarantee a reasonable maximum response time is included. One skilled in the art will appreciate that the embodiment with an extra thread (5 threads) takes into account the needs of the I/O devices (especially the high-speed "serial" ports), i.e., their tolerance to an occasional slow interrupt response. Because there may be a total of 128 threads on the chip, in one embodiment, and all of threads could have generated several main memory references at once, the potential of an incredibly long interrupt response time is low but not non-zero. A dedicated thread, however, could be designed to execute with a guaranteed worst-case latency. In one embodiment, the dedicated thread's kernel would be hand-adjusted to avoid freezing for long-latency cache misses by using some special instructions described below, e.g., the "check valid" and "cache line lock" instructions.

In one embodiment, the local 4 KB instruction cache consists of 64/64-byte lines. No special instruction buffering, branch prediction, etc., are needed because the simple nature of the 5-stage pipeline of the processor. This cache may be reloaded from the main cache through the normal data reference crossbar using 8/16-cycle gang loads when a cache miss occurs.

Exemplary instructions required to deal with some of the modified core and/or memory system intricacies of the multi-core multi-thread chip are described below. It should be appreciated that the list of instructions is meant to be illustrative and not limiting, as other instructions may also be included.

Load/Store (LD/ST) Synchronization Instruction: [LD/ST rd, offset(rt)] Because of the way the memory system is distributed throughout the chip, it is more difficult to handle the standard LL/SC (Load linked/Store Conditional) pair than an atomic instruction that performs tile functions of both a load and store. While this instruction can be as simple as an "exchange," i.e., load old contents of a memory location while saving new ones, there may be also some more complex logic at each memory bank to make this instruction (or instructions, if more than one specialized variety is desired) have more functionality, e.g., compare-and-swap functionality. Depending upon the function of this logic, the returned data might be related to the contents of memory, or the returned data may be a success/failure flag.

Memory Barrier Instruction: [SYNC or PSYNC] This instruction forms a complete memory wall for the thread, forcing all memory references before it to complete. The memory barrier instruction works by freezing the thread at the end of the SYNC's decode stage until the memory reference count for the thread is zero and all memory-reference instructions for this thread ahead of the SYNC have been executed. Otherwise a memory reference instruction immediately before the SYNC wouldn't be synchronized, since the memory instruction won't issue a reference to the LD/ST unit quickly enough. In one embodiment, the instruction is configured for a single thread (SYNC) or for all threads on a processor (PSYNC, available in kernel mode only). The memory barrier instruction enables inter-thread communication and I/O control, since normally memory accesses may be reordered in any manner by the memory hierarchy, and there is usually no indication of when stores are completed.

Check "valid" or "LD returned" Bits: [LCK rd, #register or LCKV rd, rs or LCKR rd] During normal operation of the processor, a thread will issue loads and then stall whenever it attempts to use the data from a load that hasn't completed. However, it may be desirable to have a kernel-mode thread (especially the microkernel thread, if it is implemented) check and see whether or not a load a thread initiated has actually completed before attempting to use the data the thread was attempting to load. The check "valid" or "LD returned" bits instructions perform this test. If the instructions indicate data is not yet available, the thread can attempt to perform other actions e.g., checking for high-priority interrupts, while waiting for the load to return. The first two forms of the instruction return the "valid" state of a particular register (using a register number encoded in the instruction or another register), while the third form dumps out all 32 "valid" bits, associated with a thread into a register. Alternatively, this third form could have an AND-mask as an input to select a specific subsection of the "valid" bit register for the thread. It should be appreciated that where the fifth thread is not implemented, then these instructions probably won't be necessary. In one embodiment, the LCKV is able to access the "valid" bits for all 5 threads using an extended 8-bit register specifier.

Alternate thread read/write: [MFTn rd, rs or MTTn rd, rs] These instructions behave like the standard MIPS move to/move from coprocessor register instructions, with the exception that the instructions move data between the registers of two different threads. These instructions are generally usable in kernel mode only, because user code should normally not be able to play around with other threads' registers. It should be noted that it may not be easy to put in a full "register valid" check and initiate a thread freeze if the check fails on the MFTn instruction, since the valid bits of another thread would have to be accessed for a cycle. If this is a hassle, then use of the previous LCKV instruction may simply be mandatory before a MFTn. In one embodiment, these instructions are used with the 5th thread for statistics gathering.

I-cache invalidate: [IINV offset(rt))] This instruction knocks the line containing the addressed word out of the local instruction cache. The instruction is meant to be used after code modifies itself. After a program makes modifications in the code space, it should SYNC to ensure that all of the data writes that generate the new code have completed. After the SYNC, it should use IINV to invalidate any of these lines that may be present in the local instruction cache. In one embodiment, no instruction of the modified code should be accessed until at least 4 cycles after the last IINV is executed, in order to prevent out-of-date instructions from being read from the local instruction cache before the IINVs complete. Of course, if any other processors are running the same code, then they will have to perform similar IINvs to ensure that none use old data by accident. The software routines necessary to control this are beyond the scope of this document. It should be noted that the I cache invalidate instruction requires an I-cache "access" during the TLB memory stage, and will therefore cause a pipeline disruption every time the instruction is executed.

Cache line lock/unlock: [CLCK offset(rt) or CUNL offset (rt))] This kernel-only pair of instructions locks a critical line into the on-chip cache, so that the line will never be forced out as lines are replaced following cache misses. After the line is locked, the associativity of the line's index is effectively reduced by one for normal caching operations. Since some cacheable lines will inevitably map to every index, it is desirable not to tie up all of the lines in an entire cache index with locked lines. Because of this, only extremely critical code sections such as high-priority interrupt handlers should be left locked for any extended period of time. In an embodiment where the 5th thread is not implemented, then these instructions likely won't be necessary.

Cache line invalidate/flush: [CNV offset(rt), CFLS offset (rt)] These instructions are for use in moving I/O stream buffers between main memory and the on-chip cache. CINV can be used to unconditionally throw away data in the cache, i.e., no writebacks will occur, even if some of the data is dirty. This instruction can be used to clear out an input buffer just before it arrives through an I/O port. Since the data will be overwritten by the I/O data soon anyway, there is little reason to write the data back out. CFLS performs the same operation, but forces any dirty data in the cache out to main memory as the lines are evicted. The CFLS instruction is generally for use before a line is sent out through an I/O port. It should be appreciated that the CFLS instruction is actually required for correct system operation and the CINV instruction is optional.

Software interrupt send: [SINT #thread] This kernel-only instruction sets the exception-signaling bit of the instruction at the end of the D/B pipeline stage of the indicated thread (which is frozen when this send is executed). The software interrupt send instruction also resets both already-executing instructions in the frozen thread's pipeline into NOPs, making the thread ready to execute the exception handler immediately after it starts executing. The EPC of the thread is set to the PC of the D/B pipeline instruction, unless that instruction is in the delay slot of a branch. In that case the EPC is set to the PC of the branch preceding the D/B instruction. These operations, which are identical to those performed on a post-switch pipeline exception, allow one thread running on a processor to force another one to take an exception, usually so a thread can switch itself out. It should be appreciated that this instruction enables the 5th thread to control scheduling, if the 5th is implemented.

Thread enable/disable: [THEN #thread or THDS #thread] This kernel-only instruction allows the operating system (OS) to put a thread into a special "deep freeze" mode so that the thread won't ever be scheduled by the threading mechanism. This is mostly of use when the OS simply doesn't have enough threads to fill up the entire machine, so that idle loops won't be scheduled to run on processors when useful work can be performed by other threads. It should be appreciated that this is an alternative instruction through which the 5th thread can control scheduling.

External communication: [MTCx rd, rs or MFCx rd, rs] For communicating with nearby processors or I/O devices, uncached accesses will probably be the main route. However, particularly high-importance devices (such as an I/O interface right next to this processor) might prefer to have control registers accessible through the coprocessor interface in order to allow fast communication (it's mostly a matter of the maximum latency allowed for the control routine). Also, this instruction might be used to send interrupts to other processors. See the description below with reference to the uncached access interface for more for further details on the use of these instructions.

The LD/ST units on each core are responsible for simultaneously buffering and tracking multiple loads and stores from all of the different threads within the core. The exact number of loads and stores that can be simultaneously be processed will have to be determined following simulation of the architecture, to find the proper trade-off between silicon area consumed and performance. This section discusses the general architecture of the buffers, without specifying the specific numbers of buffers in any location.

TABLE 1

| FIELD NAME | BIT WIDTH | NOTES |
|---|---|---|
| Thread Number | 2 or 3 | Controls data return |
| Register/I-word Number | 5 | Controls data return |
| Physical Address | 61* | Holds here until sent to memory |
| Store Data | 64 | Holds here until sent to memory |
| Store Mask | 8 | Byte-by-byte store mask |
| Retry Time | 10-12 | Time to reinsert entry into arbitration queues |
| Command | 3 | 000 = LD, 001 = ST, 010 = LD/ST**, 011 = I = refill, 100 = CLCK, 101 = CUNL, 110 = CINV, 111 = CFLS |

Queues may be formed within the reference list using additional fields containing linked-list pointers between the queue elements, along with head and tail pointers in registers off to the side. Alternately, queues may be formed using side register files holding lists of pointers to entries in the master register file list. Additionally, the reference list maintains an up/down counter for each thread that maintains a current count of the number of pending references for that thread. The counter is configured to increment up or down by 0, 1, or 2 references every cycle (I-fetch, D-fetch out, cache hit, store-to-memory complete back). In case the thread does a SYNC instruction, this counter is used to determine when it is safe for the thread to continue execution.

If the processors have to participate in some form of centralized arbitration in order to get access to the first (or only) crossbar stage, then the LD/ST unit is responsible for maintaining ordered queues of references that are waiting to participate in arbitration. When an arbitration is successful, the arbiter will only notify the LD/ST unit which queue (if more than one is implemented per processor) got access to the crossbar. It is the arbitration queue's job of remembering which request is first, i.e., the request that the arbiter just cleared.

Once a reference is cleared for execution by the crossbar arbitration scheme, it is shipped off into the memory system. The LD/ST unit then tracks of which memory references are "in flight" so that it may process them correctly when the references return. For a system with a buffering crossbar and variable length memory references, this tracking is accomplished by sending the address of the reference in the reference list along with the memory reference. When the reference returns, it will still be accompanied by this address, which can then be used to look up critical information in the reference list such as the thread and register numbers.

Figure 3:
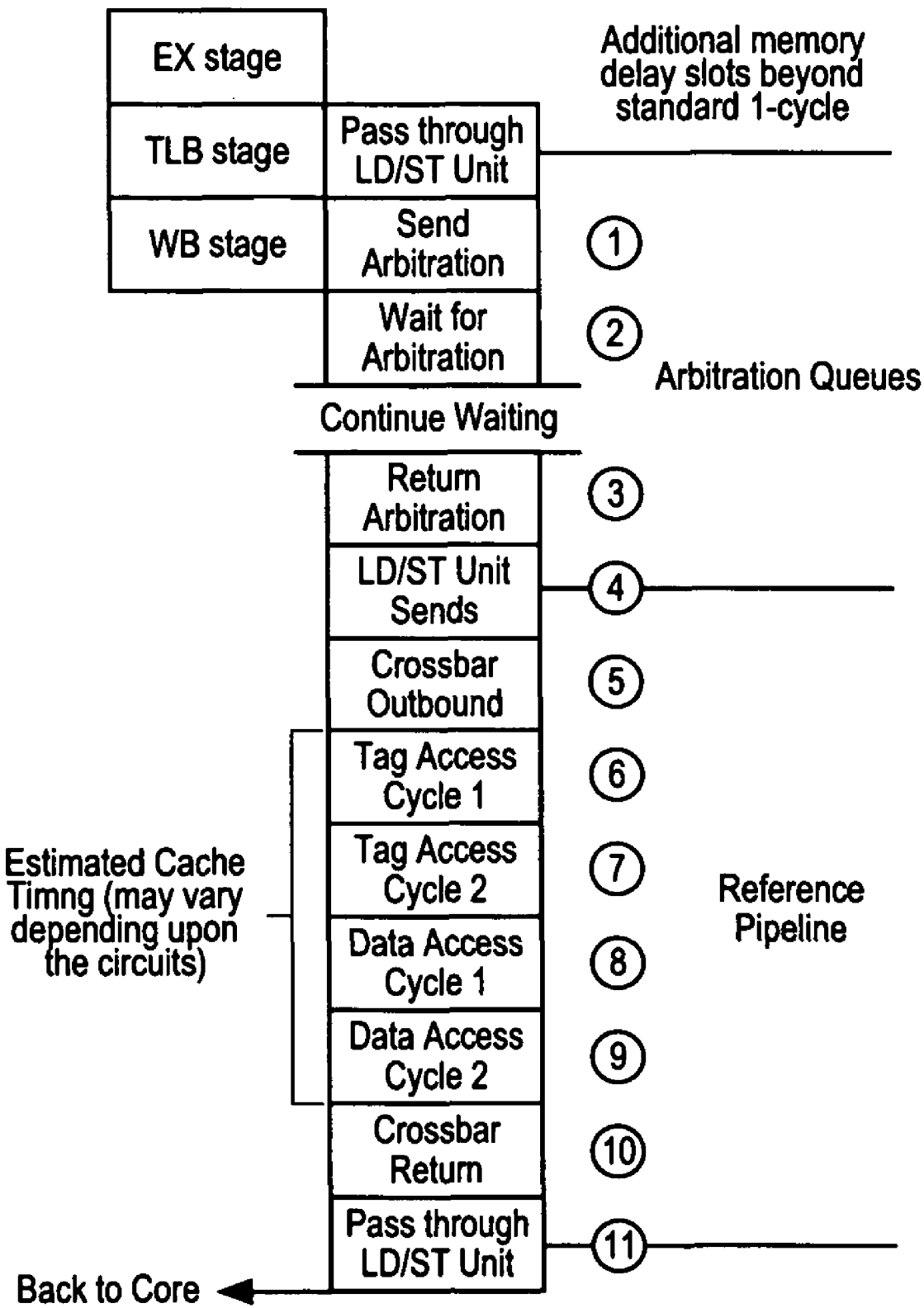
FIG. 3 is a high level schematic diagram of a fixed length load pipeline in accordance with one embodiment of the invention.

If the chip implements a crossbar with no buffering, that can support fixed-delay returns, then a small pipeline must be included in the LD/ST unit to remember which reference will be coming back on which cycle. The pipeline delays the reference list ID number of the access for several cycles while the pipeline of FIG. 3 plays out. FIG. 3 is a high level schematic diagram of a fixed length load pipeline in accordance with one embodiment of the invention. The four main steps of the load pipeline are arbitrating for the crossbar, sending the request on crossbar, accessing the cache and returning the response on the crossbar. These load pipeline portions take a total of 11 pipeline stages which are numbered on the right of FIG. 3.

When the reference returns, the reference list ID is recovered from the end of the pipeline and the information from the reference list is used to complete the access in a manner identical to the return from a buffered system.

On another item of note that appears in this diagram, the MIPS "memory" stage of the pipeline is now exclusively for accessing the TLB and preparing the reference list for accepting the new memory access (if necessary, these can also be serialized into 2 separate cycles). The actual cache reference occurs much later. However, writeback may still occur at the same time as normal, because all memory exceptions (except low-level system violations like ECC faults) are detected during the TLB access, allowing normal MIPS exception handling during the writeback stage. Low-level system error faults such as ECC would have to be handled imprecisely. In one embodiment, the low level system error faults are handled by the $5^{th}$ thread.

If "dumb" cache banks are used, then references will not be automatically completed by the cache banks after data is recovered from memory after a cache miss. Instead, it will be the responsibility of the LD/ST units to retry accesses periodically until they finally hit in the cache, at least for loads (an alternative for stores is described below). To accomplish this, another reference queue tracks all references that are waiting for a retry. As each reference is added to the retry list, it is given a timestamp from a free-running timer in the processor indicating when it should be attempted again. When the reference reaches the head of the queue, this number is continuously checked against the current time, and when the times match the reference is removed from the retry queue and moved to the appropriate arbitration control queue, to await another shot at the cache.

Whenever uncached references (as indicated by the TLB) are encountered, they are sent directly to main memory using the uncached access and control link that runs around the chip. Uncached loads and stores both require an uncached reference link, a send and a receive link-one to initiate the access and one to complete the access. For a load, the first half sends out the address and the second returns the data. For a store, the first half sends out both address and data, while the second is simply a return receipt. Because of the speed of the links and main memory, the access will be slow. However, these accesses should be fairly infrequent.

Another, optional use for the uncached access link is to eliminate some or all of the retrying that the load/store units normally perform over the crossbar using return "receipts" from the main memory interface sent out over the uncached reference link. This would be reasonably easy for cache flush operations that hit in the cache (triggering a writeback that is considered part of the access) and cache locks or stores that miss (triggering line fetches that are considered part of the access), although the stores would probably stretch the bandwidth of the uncached reference link. With an enhanced link, it might even be possible to have load misses to the cache return like uncached references, eliminating the need for cache retry operations completely. Most operations would not require any additional hardware, but handling store misses would. In particular, the cache bank must be modified so that it can temporarily hold the stored data in an input buffer until the line arrives from main memory so the reference can complete without any re-storing of the data from the processor. Further details on this option is included in U.S. patent application Ser. No. 10/855,658 which is incorporated by reference in its entirety for all purposes. The receipts are sent from the main memory interface just after the interface finishes handling the writeback or line fetch. This gives an indication of when the flush, store, or cache lock has actually completed to the LD/ST that initiated it, that they would normally get following a retry, so that it may be removed from the reference list. It should be noted here that it is necessary for the LD/ST unit to continue tracking cache flush operations until the line has been flushed to memory in case a SYNC instruction is issued in the core afterwards (a likely occurrence just before an I/O operation). The primary problem with this option is the (intentionally) limited bandwidth of the uncached reference link. If this option is used, then the traffic on the uncached reference link will probably be much heavier, and the bus will therefore need to be redesigned with this extra traffic in mind, e.g., with multiple links running in parallel.

This system, as currently designed, offers no guarantees regarding memory reference ordering unless the SYNC instruction (or an implicit SYNC operation as part of another instruction) is used. References to different cache banks proceed through the memory system completely independently, without any ordering regard for one another. References to the same cache bank will proceed in order for the most part, but if a reference misses in the cache others will be allowed to pass it and complete first. It should be appreciated that in order to enforce in-order execution of accesses within a thread where necessary, multithreaded software synchronization routines should include SYNC instructions in their code.

Because of the potential for references being handled out-of-order during a cache miss, the arbitration queues ensure that multiple accesses to the same word in memory by a single thread are sent to the lower memory system in strict program order to prevent the intermittent failure of simple code sequences like LD x/ST x/LD x. Thus, disambiguation logic in the memory reference queues is required to properly sequence and/or merge the accesses, as is appropriate.

Figure 4:
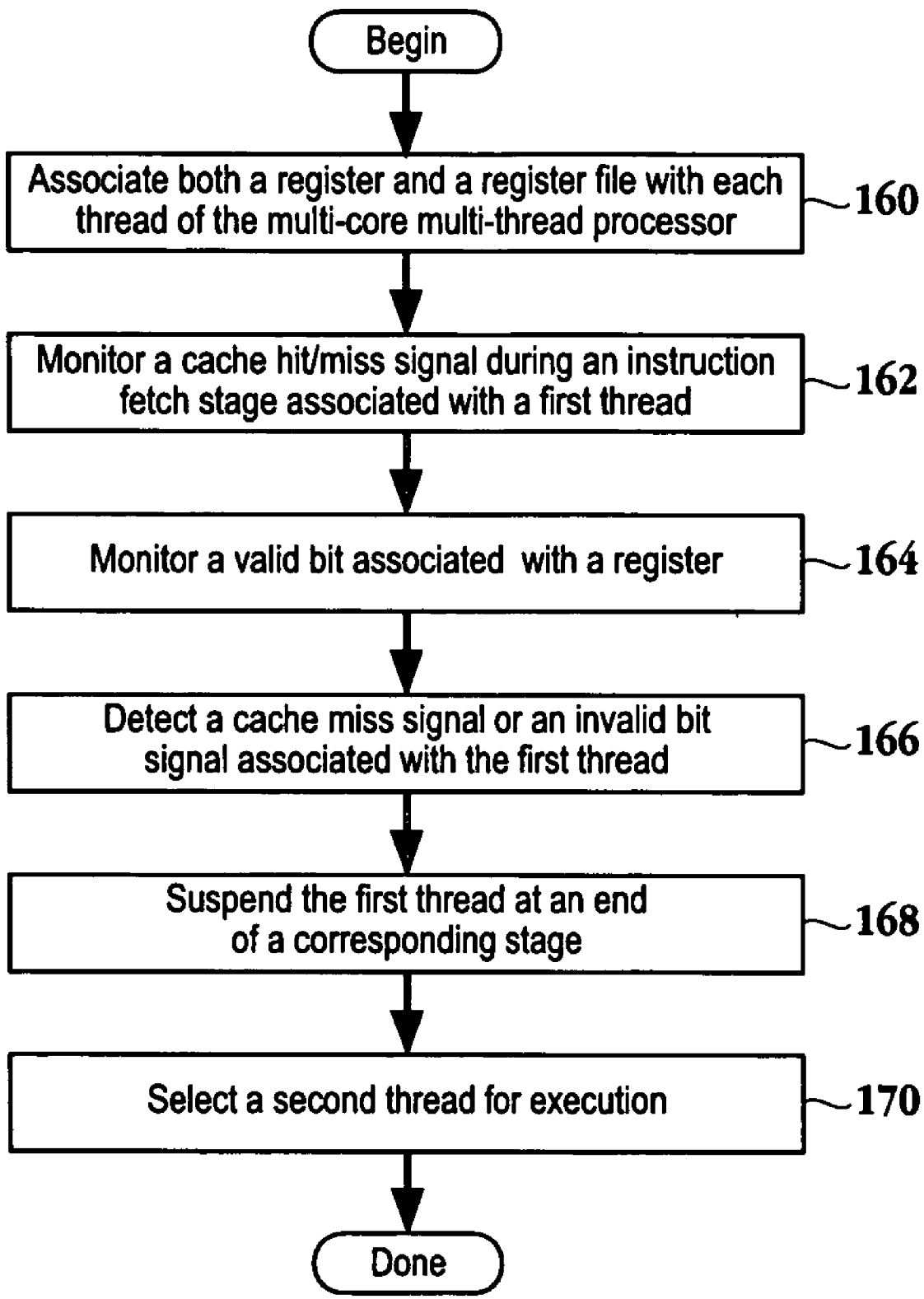
FIG. 4 is a flowchart diagram of the method operations for determining when to switch threads in a multi-core multi-thread processor in accordance with one embodiment of the invention.

FIG. 4 is a flowchart diagram of the method operations for determining when to switch threads in a multi-core multi-thread processor in accordance with one embodiment of the invention. The method initiates with operation 160 where a register and a register file is associated with each thread of a multi-core multi-thread processor. In one embodiment, the register and register files are duplicated as illustrated in FIG. 2. In another embodiment, a fifth thread dedicated to interrupt handling is included along with its associate register and register file. The method then advances to operation 162 where a cache hit/miss signal is monitored during an instruction fetch stage associated with a first thread. In operation 164 a valid bit associated with a register is monitored. As discussed above with reference to FIG. 2, each register (file and pipeline) which enables a core to recognize when data has not been returned from a load. Then, in operation 166, a cache miss or an invalid register is detected. In response to detecting the cache miss or invalid register, the first thread is suspended at an end of the corresponding stage in which the first thread is being executed. The method then advances to operation 170 where a second thread is selected for execution. As discussed above, the second thread may be selected through a scheduling algorithm when more than one thread is available for selection. Where no threads are available, NOPs signals are issued until a thread becomes available. It should be appreciated that one of the multi-threads may be dedicated to interrupt handling as described above.

Figure 5:
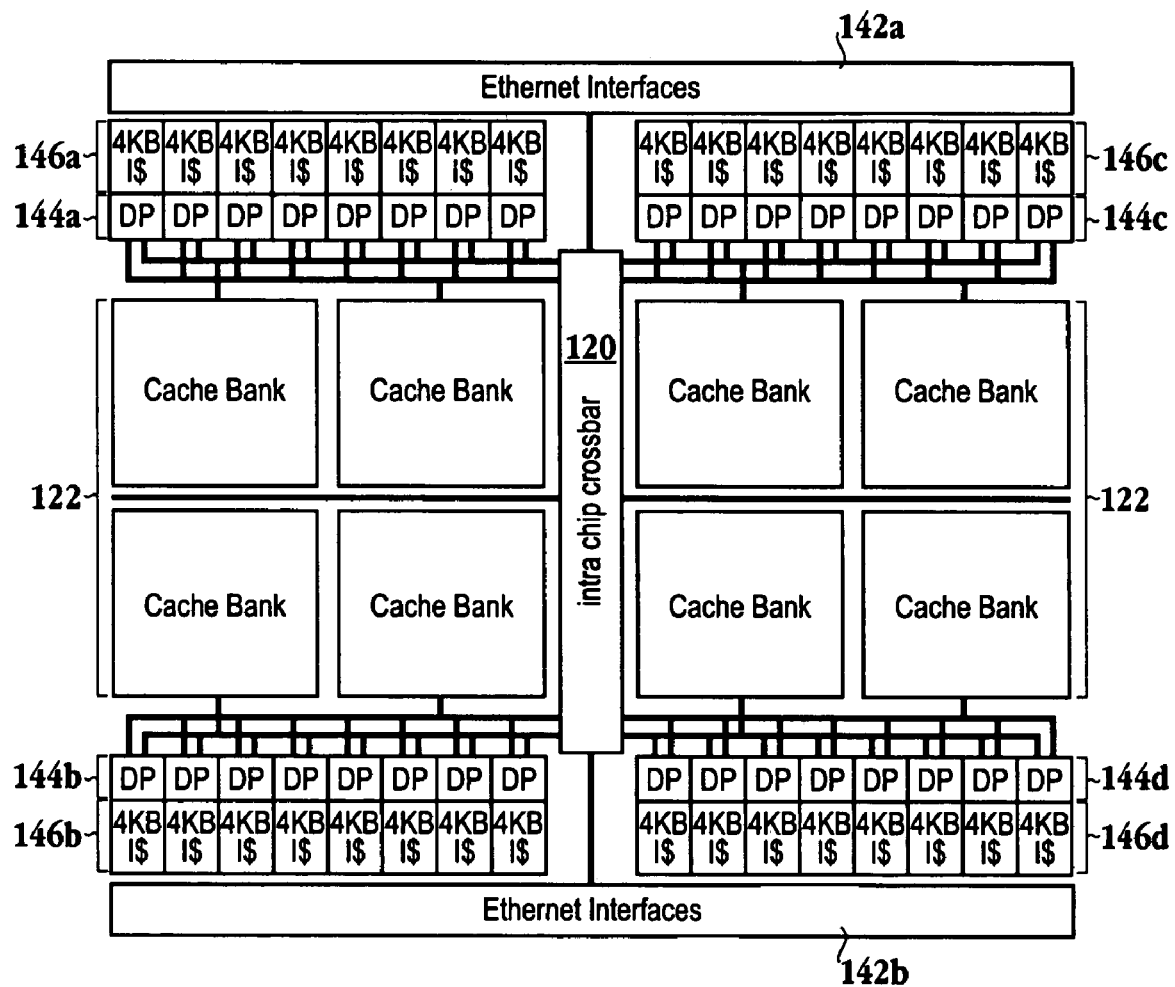
FIG. 5 is an alternative schematic representation of the multi-thread multi-core processor chip of FIG. 1.

FIG. 5 is an alternative schematic representation of the processor chip of FIG. 1. Here, crossbar 120 is in communication with data pathways 144a-144d, and L2 cache banks 122. It should be appreciated that only 2 sets of cache banks 122 are shown due to limitations of illustrating this configuration in two dimensions. Two additional cache banks are provided, but not shown, so that each data pathway 144a-144d is associated with a cache bank. Ethernet interfaces 142a and 142b provide access to a distributed network. In one embodiment, Ethernet interfaces 142a and 142b are gigabit Ethernet interfaces. Level one cache memories 146a-146d are provided for each of the processor cores associated with data pathways 144a-144d.

Figure 6:
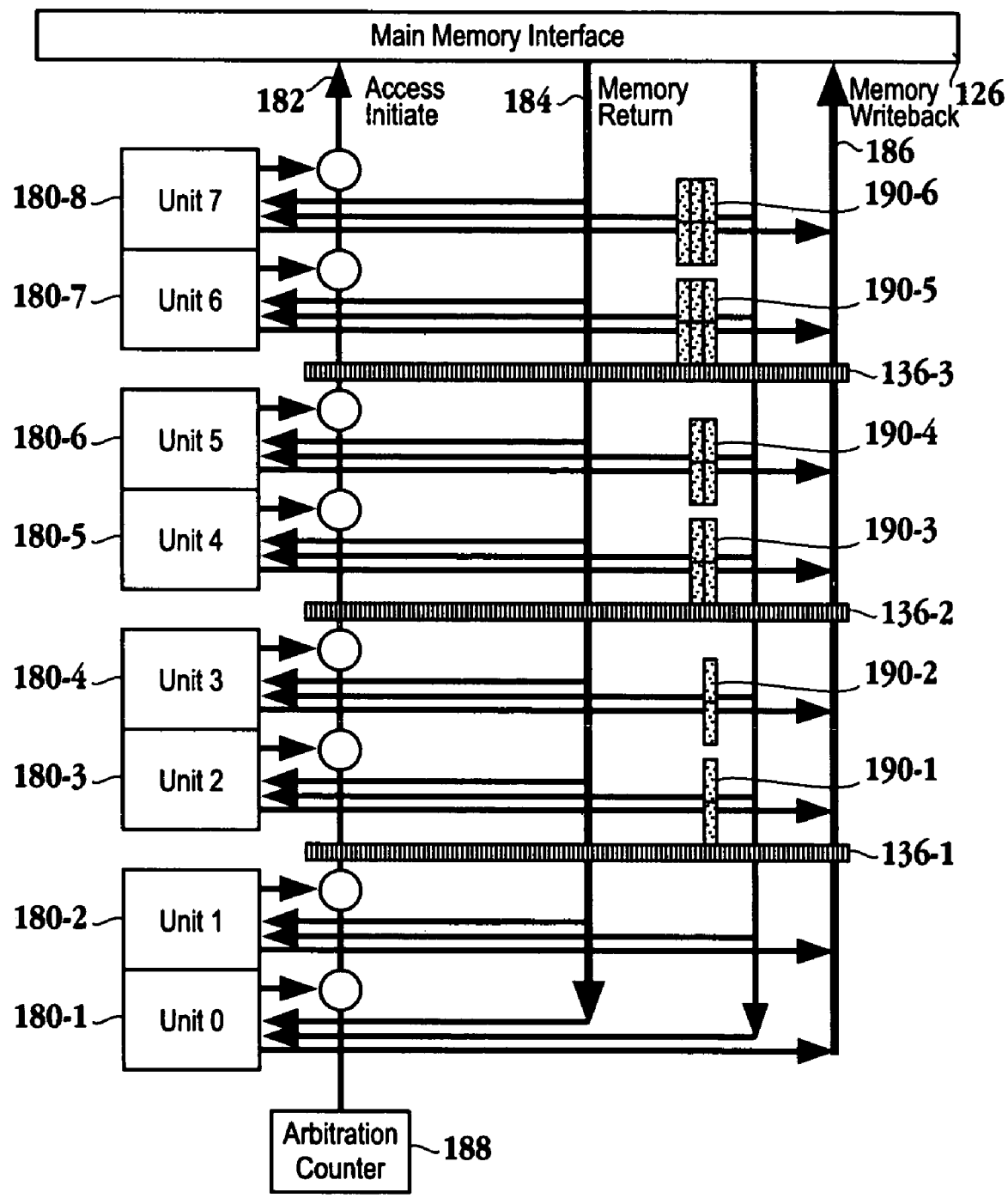
FIG. 6 illustrates a configuration of the main memory communication link in accordance with one embodiment of the invention.

Connecting the cache bank and I/O interfaces to the main memory port, of the multi-thread multi core chip described herein is a communication link controlled by the main memory interface. Described below is the structure and function of the communication link. FIG. 6 illustrates a configuration of the main memory communication link in accordance with one embodiment of the invention. Here, several units 180-1 through 180-8, which may be cache banks or direct memory access (DMA) engines on I/O interfaces, are attached to a single link. In one embodiment, each of units 180- through 180-8 are connected to one link. One skilled in the art will appreciate that each main memory bank may be at the end of one or more links, physically (which together logically act much like a single link). In another embodiment, in order to ease circuit design, the link can be pipelined into multiple stages. The link in FIG. 6 has four stages, for exemplary purposes only, as the link may have any suitable number of stages.

The main memory communication link consists of three major portions: Access/DMA Initiation section associated with line 182, Memory Return section associated with line 184, and the Memory Writeback section associated with line 186. Access/DMA Initiation section is used by cache banks or DMA engines 180-1 through 180-8 to send read or write requests to a main memory bank through main memory interface 126. This section is arbitrated cycle-by-cycle in a round-robin fashion among all of units 180-1 through 180-8 on the link using counters either within each unit or at the "head" end of the link, as shown by arbitration counter module 188. Each unit 180-1 through 180-8 is given a slot every N cycles (where N=the number of units), whether it is used or not. Because this link should not be overwhelmed with requests, this simple but inefficient arbitration scheme should be acceptable. It should be noted that this portion of the link is the only one that does not have to logically merge when multiple physical links flow into the same main memory interface. If desired, different physical initiation tracks can run completely in parallel. However, the tracks may also be designed to logically merge together, so that the tracks are only used on alternate cycles in another embodiment.

The Memory Return section 184 is configured to return requested data from main memory as the requested data arrives from the off-chip interface through main memory interface 126. In one embodiment, each unit snoops the link and simply picks off any cache lines that are addressed to it. Memory Writeback section 186 is used by units 180-1 through 180-8 sending data to the main memory. The control lines for this bus are driven by main memory interface 126 several cycles before the bus needs a line to be written out to main memory. It should be appreciated that the exact number of cycles is set by the total number of pipeline stages required between the request being made and the data being received. When one of units 180-1 through 180-8 receives this grant, the unit must dump out its dirty/incoming cache line onto the data portion of the Writeback link. Memory interface 126 may then take this data and send it right out to the main memory. As is shown in FIG. 6, the links on this path close to the main memory interface require extra delay registers 190-1 through 190-6 so that the degree of pipelining for the round trip through both halves of the link will be the same for all units on the link, no matter how far away the units are from main memory interface 126. Blocks 136-1 through 136-3 are pipeline registers and function to pipeline the round trip for units that are farther away from the main memory interface.

Table 2 below summarizes the field names and associated notes for each of the three major portions of the main memory communication link described above.

TABLE 2

| Zone | Field Name | To | Bits | Notes |
|---|---|---|---|---|
| Unit Initiate | Access Number | Main | ~4 | Number of buffer within miss handler or DMA controller |
| | Physical address | Main | 57* | Address of line to read or write |
| | R/W Control | Main | 1 | Direction of access |
| | Unit Control | All units on the link | 3 | OPTIONAL This runs from a counter at the end of the link to all units on the link. It selects which unit can send an access this cycle. This can be replaced with a counter at each sender. |
| | Timeout Limit | Main | ~8 | OPTIONAL line for I/O only Gives maximum time for access to be handled without draining buffers, for prioritization purposes |
| Memory Return | Unit Number | Unit | 3 | Selects the unit that will receive this cache line |
| | Access Number | Unit | ~4 | Access number that was sent to the main memory interface originally |
| | Data | Unit | 32 | Data from memory, returned at twice the memory interface speed (at least) |
| | Word | Unit | 4 | OPTIONAL Specifies which word of the cache line is being returned on this cycle. This can be replaced with a counter at the receiver. |
| | Valid | Unit | 1 | Specifies whether or not there is valid data on the bus during this cycle |
| Memory Writeback | Unit Number | Unit | 3 | Selects the unit that will be able to write to the bus during the next write cycle |
| | Access Number | Unit | ~4 | Access number that was sent to the main memory interface originally |
| | Valid Grant | Unit | 1 | Specifies whether or not there is a valid grant being sent out this cycle |
| | Data | Main | 32 | Data to memory, sent at twice the memory interface speed (at least) |

TABLE 2-continued

| Zone | Field Name | To | Bits | Notes |
|---|---|---|---|---|
| | Word | Main | 4 | OPTIONAL Specifies which word of the cache line is being returned on this cycle. This can be replaced with a counter at the receiver. |
| | Valid | Main | 1 | Specifies whether or not there is valid data on the bus during this cycle |

*This assumes a 64-bit address, with the lower 3 bits assumed to be 0. However, from here on out physical addresses actually only need to be maintained to about 40 or so bits. That is, the bit size for the physical addresses are big enough to handle the largest possible main memory configuration that the particular implementation of the architecture can handle.

Because the cache crossbar and main memory communication links are configured very precisely for their tasks, instead of being general-purpose buses, it is difficult to force uncached accesses through them without adding considerable complexity to the controllers for those links. As a result, a separate, low-bandwidth network is provided for use when processors must execute uncached accesses, read control registers from an I/O port (optionally), or other uncommon communication events such as cross-chip interrupt signals. Since uncached accesses are usually rather rare, this link has been designed to minimize the amount of hardware required for implementation. The uncached access link is further described below.

The uncached access link is a ring network that hops from unit to unit around the chip. There is one register in the ring at each unit, plus logic to insert or remove references from the ring. Physically long hops on the ring may be interrupted with additional registers in order to ensure that a critical path is not accidentally introduced. Each access on the ring "occupies" one hop-length while moving around the ring from its source to its destination. If the destination is busy, and cannot service the access, then the reference is not removed from the ring and simply flows around again, creating an automatic retry mechanism. Of course, all units are designed so that the units will eventually be able to service accesses. Accordingly, this network structure allows a single link to serve a large, homogeneous collection of units that need to communicate occasionally while minimizing the logical and physical design required for this subsidiary network. The network structure may be analogized to a wide, slightly fancy scan chain in one embodiment of the invention.

Table 3 illustrates the bit width associated with field names for the network structure in accordance with one embodiment. Two options are proposed in Table 3. The first option puts all of the signals completely in parallel, so the signals march around together. The second option divides each access into two halves that use the ring on opposite cycles. If this option is used, the ring must have an even number of registers. In another embodiment, through encoding modifications, it would also be possible to stretch out references over three or more cycles in order to reduce the number of wires required for the link. In all of these cases, the total number of registers in the ring must be divisible by the number of cycles chosen for the access length.

TABLE 3

| FIELD NAME (cycle) | Bit Width | Notes |
|---|---|---|
| Destination Unit (1) | ~6 | Target unit on the ring |
| Source Unit (2) | ~6 | Source unit on the ring, that will need results of the access returned to it. |
| Command (1) | 2+ | Interrupt, load, or store? Could also be extended to signal "return receipts" or other operations |
| Address (1) | ~61* | Physical address to access (or internal I/O register, or interrupt vector for interrupts) |
| Data(2) | 64 | Data from load or data to store |
| Store Mask (1 and 2) | 8 | Signals which bytes of word to store |
| Valid Bit | 1 | Valid access is on this hop of the link |
| Cycle Bit | 1+ | Indicate which cycle of a multi-cycle access that is. |

*See the Table 1 and the section above describing the load/store unit for further details.

The simple physical design comes at a cost, however, in lower performance. Latency over the link will average out to be N/2 cycles on average where N equals the number of units plus the number of extra registers included in the ring. In one embodiment, N is about 50 or so. Since most transactions over this link involve a send and a receive, the ring itself will almost always add N cycles of latency to every access. Depending upon the arbitration algorithm used and the amount of traffic on the link, arbitration times could easily add another N cycles to this latency (and 2N for a two-cycle access ring, 3N for a three-cycle access, etc.). Available bandwidth is limited by the fact that a large number of units share the same ring, and will drop off significantly if many units are trying to use the link simultaneously.

There are two basic ways to handle arbitration on this link: dumb, inefficient, and guaranteed to work; or fancy, more efficient, and potentially more difficult to troubleshoot. The basic way is to allocate every $N^{th}$ cycle to each particular unit (N in this case does not need to count extra pipeline registers). This scheme is simple, and will guarantee an N/2 arbitration time, on average. This scheme will also limit the bandwidth out of any until to 1/N of the link's maximum bandwidth, limiting performance for bursty accesses.

An alternative scheme is to allow any port to try and use any cycle that is free on the link when the port needs to send out an access. In order to prevent "link hogging," it is preferable to have units back off and intentionally leave free cycles on the ring if they issue several accesses in succession. The more a unit sends, the more the respective unit has to back off afterwards. It will be apparent to one skilled in the art that further control over this back off could be obtained using a counter-rotating ring that would allow "downstream" nodes to notify "upstream" nodes when the downstream nodes were using the link too much.

Each of these units acts as a "gatekeeper" to a bank of DDR SDRAM main memory located outside the chip. Each DDR bank's port is 64 bits wide, and will probably run at 250-400 M transfers per second. Several main memory communication links and a branch of the uncached access link ring will merge at each main memory interface unit. The main memory interface unit is in charge of arbitrating among the links and controlling access to its slave memory bank.

Figure 7:
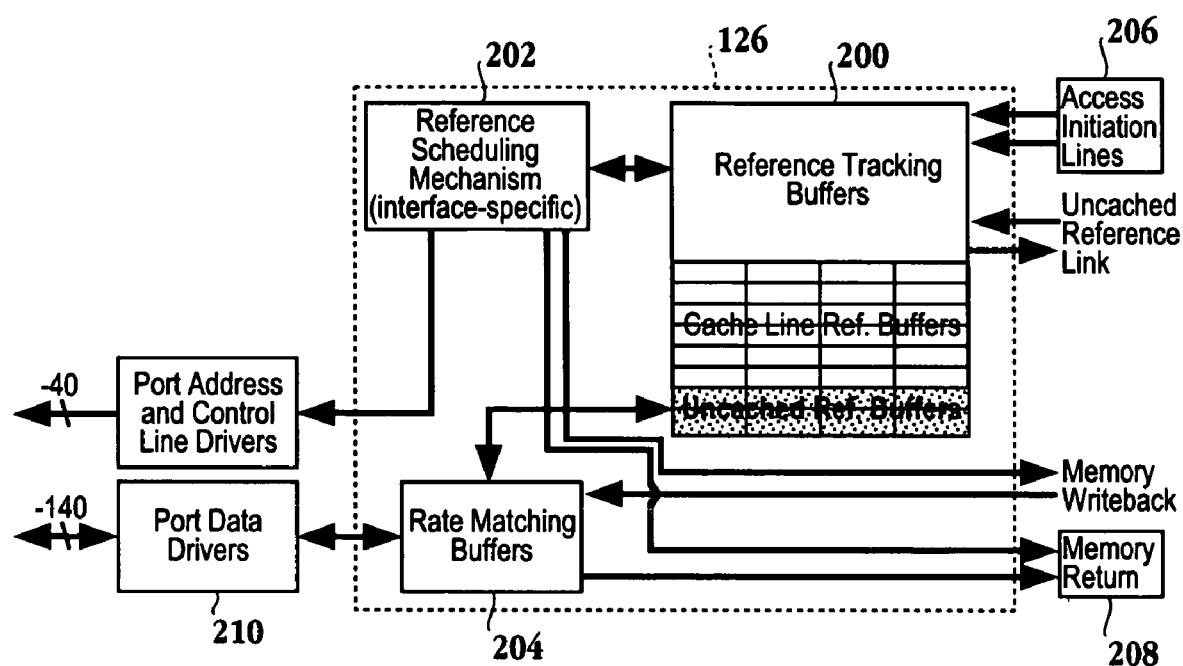
FIG. 7 is a schematic diagram illustrating the main components of the main memory interface in accordance with one embodiment of the invention.

FIG. 7 is a schematic diagram illustrating the main components of the main memory interface in accordance with one embodiment of the invention. Main memory interface 126 consists of three main portions: Reference Tracking Buffers 200, Reference Scheduling Mechanism 202, and Rate Matching Buffers 204, which are each described in more detail below.

Reference Tracking Buffers 200 track all memory accesses that memory interface 126 is responsible for handling. It should be noted that Reference Tracking Buffers 200 act like the Reference List entries in the processor load/store units. There are two types of buffer entries. Line buffer entries hold the information sent to main memory interface 126 over the Access Initiation Lines 206, e.g., source unit, access number, physical address, R/W direction, and optionally the I/O timeout, on the main memory links from the cache banks assigned to this main memory bank and each of the DMA units of the I/O interfaces. Normally, one entry will be required for each source unit and access number, so these can just be encoded implicitly in each buffer entry. If fewer buffers are actually implemented, then flow-control mechanisms may be put on Access Initiation Lines 206 to prevent buffer overflows. Uncached reference buffers hold reference information, e.g., source unit, physical address, R/W direction, store mask, and any store data, that has come in over the uncached reference link. Additionally, each buffer will also have one or more fields for the internal use of the RSM, below.

Reference Scheduling Mechanism 202 is the heart of memory interface 126. Reference Scheduling Mechanism 202 works similar to the Arbitration Queues in the load/store unit combined with the arbiter. Pointers to all incoming references in Reference Tracking Buffers 200 are queued up in internal queues of Reference Scheduling Mechanism (RSM) 202 until time on main memory interface 126 can be scheduled for the access. The structure of these queues varies somewhat depending upon the dynamic random access memory (DRAM) chips used, which takes into account factors like their internal architecture. Since the structure is fairly complex, the structure should be detailed after the exact structure of the DRAM interface is fixed. No matter what the internal structure, RSM 202 is ultimately responsible for routing addresses, unit numbers, and other necessary information out to the address-control portion of the DRAM port unit and up the two main memory buses in lockstep with each DRAM access. For example, when bringing in a cache line, RSM 202 will send the address of the cache line out over the address pins to the DRAM, perhaps more than once, if multiple access are necessary to recover a full cache line. Later, RSM 202 will predict when the reference will return and will set the proper signals on the control lines for Memory return link 208.

Rate Matching Buffers 204 are a small set of buffers that take 32-bit, full-clock-rate streams of data from the data portions 210 of the on-chip memory links and feed them into the slower, wider DRAM interfaces. Because the overall speeds of the two links should be fairly closely matched to the speed of the off-chip port, these buffers should not need to be very large at all. In essence, the data part of the interface is run in a "just in time" manner to minimize the number of extra buffers needed.

It should be noted that the DRAM interface mentioned above will likely be a 64-bit wide DDR SDRAM interface using a 250-400 MHz, depending upon what reasonable-priced DRAM chips are available. Each of these interfaces will require about 110-130 points, including control lines, DIMM select lines, address lines, and additional "data" pins for error correction code (ECC) bits. In one embodiment, the DRAM interface might be implemented with a large amount of existing intellectual property (IP).

In one embodiment, the ability to attach additional low-performance peripherals is required, at least to allow system configuration information to be read into the chip just after an initial reset for some sorts of basic input output system (BIOS) read only memory (ROM) chip. Such an interface would also allow connection of other low-bandwidth I/O devices such as front panel controls, serial interfaces for service terminal connections, etc.

It should be appreciated that the exact structure of the I/O interface would have to be determined following the determination of what additional components are to be included in the system, and their total bandwidth requirements. The structure may be a general purpose 32-bit processor bus, e.g., the MIPS SysA/D bus, a PCI bus, a simple 8-bit micro controller-style bus, or even a simple serial bus such as I²C. The bus would be connected to the other internal components of the chip as a single extra node on the uncached access link, making the bus' on-chip integration simple.

The miscellaneous I/O unit would also include system-level interrupt lines from off-chip interrupt sources. Depending upon the latency allowed for interrupt handling from these sources, interrupts could be handled through uncached access link commands (if latency is not critical) or through direct interrupt signals to the processor core located closest to the interface. The former implementation would be easier to make, but its performance might be too low for some system designs. One skilled in the art will appreciate that this will have to be determined based on the interrupt latency tolerance of all components of the final system.

Figure 8:
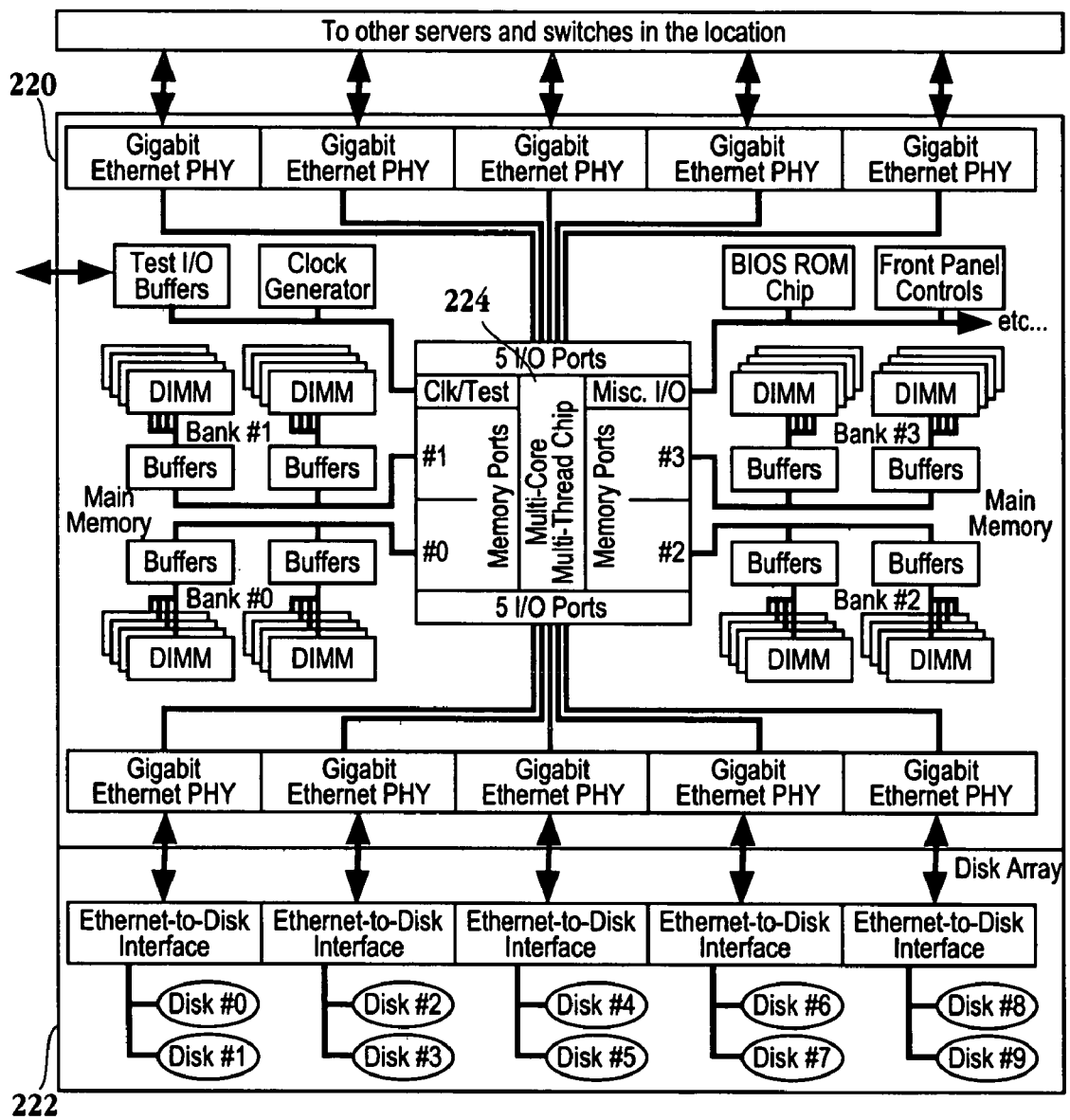
FIG. 8 provides a high level schematic diagram of the system layout foe the embodiments described herein.

FIG. 8 provides a high level schematic diagram of the system layout for the embodiments described herein. Thus, module 220 may represent a server incorporating multi-core multi-thread chip 224 as described above. Disk array 222 is associated with module 220 for allowing access to stored data on the disk array. The module contains the multi-core multi-thread processor chip, DRAM main memory, Ethernet interfaces and miscellaneous chips for booting and testing.

In summary, the above described embodiments provide multiple cores on a chip where each of the cores have at least two threads. The multithreaded multiple cores define a high throughput architecture configured to efficiently support a server application capable of serving a number of clients. Additionally, the architecture exploits the multiple threads of a server application. In one embodiment, the architecture of the processor cores are simplified due to the thread level parallelism and the simplified pipeline, i.e., single issue pipeline.

Furthermore the invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A processor, comprising:
    at least two cores, each of the at least two cores having a first level cache memory, each of the at least two cores being multi-threaded;
    a crossbar;
    a plurality of cache bank memories in communication with the at least two cores through the crossbar, each of the plurality of cache bank memories in communication with a main memory interface;
    a plurality of input/output (I/O) interface modules in communication with the main memory interface and providing a link to the at least two cores, the link bypassing the plurality of cache bank memories and the crossbar; and
    threading hardware configured to enable each of the at least two cores to switch from a first thread to a second thread on a cycle-by-cycle basis using storage that includes a plurality of pipeline registers for each thread and a register file for each thread, wherein the first and second threads are not continuously stored, wherein the switch from the first thread to the second thread depends at least in part on a round robin scheduling of any threads that are not blocked, wherein the threading hardware further includes (a) duplicated register files associated with each of the at least two cores, wherein each duplicated register file has a second nonstandard write port, and (b) a first set of duplicated pipeline registers downstream from instruction fetch stage logic and a second set of duplicated pipeline registers downstream from decode/branch stage logic.

2. The processor of claim 1, wherein each of the at least two cores includes
    a load/store unit having a master reference list.

3. The processor of claim 2, wherein the master reference list includes memory access handling registers for memory references associated with a respective core.

4. The processor of claim 2, wherein the master reference list is configured to associate the address of a memory reference with both a respective thread and a respective register number.

5. The processor of claim 1, wherein the cache bank memories are single ported static random access memories.

6. The processor of claim 1, wherein each of the plurality of cache bank memories has a size of one megabyte.

7. The processor of claim 1, wherein the link is a ring network of hops between the I/O interface modules.

8. The processor of claim 1, wherein the threading hardware further includes,
    a watchdog counter to monitor processor usage in order to freeze a thread consuming an amount of processor time that is greater than a threshold amount.

9. A server, comprising:
    an application processor chip, the application processor chip, including:
        a plurality of multithreaded central processing unit cores, each of the plurality of multi-threaded central processing unit cores having a load/store unit;
        a crossbar;
        a plurality of cache bank memories in communication with the at least two cores through the crossbar, each of the plurality of cache bank memories in communication with a main memory interface;
        a plurality of input/output (I/O) interface modules in communication with the main memory interface and providing a link to the at least two cores, the link bypassing the plurality of cache bank memories and the crossbar; and
    threading hardware configured to enable each of the at least two cores to switch from a first thread to a second thread on a cycle-by-cycle basis using storage that includes a plurality of pipeline registers for each thread and a register file for each thread, wherein the first and second threads are not continuously stored, wherein the switch from the first thread to the second thread depends at least in part on a round robin scheduling of any threads that are not blocked, wherein the threading hardware further includes (a) duplicated register files associated with each of the at least two cores and (b) a first set of duplicated pipeline registers downstream from instruction fetch stage logic and a second set of duplicated pipeline registers downstream from decode/branch stage logic.

10. The server of claim 9, wherein the server is a web server.

11. The server of claim 9, wherein each duplicated register file has a second nonstandard write port.

12. The server of claim 9, wherein the link is a ring network of hops between the I/O interface modules.

13. The server of claim 9, wherein each of the plurality of multi-threaded central processing unit cores is associated with five threads, one of the five threads being dedicated to handle interrupts.

14. A processor, comprising:
    at least two cores, each of the at least two cores having a first level cache memory, each of the at least two cores being multi-threaded;
    a crossbar;
    a plurality of cache bank memories in communication with the at least two cores through the crossbar, each of the plurality of cache bank memories in communication with a main memory interface;

a plurality of input/output (I/O) interface modules in communication with the main memory interface and providing a link to the at least two cores, the link bypassing the plurality of cache bank memories and the crossbar;

and threading hardware that includes duplicated register files associated with each of the at least two cores, wherein each duplicated register file has a second nonstandard write port.

15. The processor of claim 14, wherein the threading hardware further includes a first set of duplicated pipeline registers downstream from instruction fetch stage logic and a second set of duplicated pipeline registers downstream from decode/branch stage logic.

16. The processor of claim 14, wherein each of the at least two cores includes a load/store unit having a master reference list.

17. The processor of claim 16, wherein the master reference list is configured to associate the address of a memory reference with both a respective thread and a respective register number.

18. The processor of claim 16, wherein the master reference list includes memory access handling registers for memory references associated with a respective core.

19. The processor of claim 14, wherein the threading hardware further includes
a watchdog counter to monitor processor usage in order to freeze a thread consuming an amount of processor time that is greater than a threshold amount.

20. The processor of claim 14, wherein each of the cores is associated with five threads, one of the five threads being dedicated to handle interrupts.

* * * * *